(12) United States Patent
Macy, Jr.

(10) Patent No.: US 7,228,002 B2
(45) Date of Patent: Jun. 5, 2007

(54) INVERSE HALFTONING PROCESS

(75) Inventor: William W. Macy, Jr., Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1196 days.

(21) Appl. No.: 09/855,292

(22) Filed: May 14, 2001

(65) Prior Publication Data

US 2002/0191857 A1   Dec. 19, 2002

(51) Int. Cl.
*G06K 9/40* (2006.01)

(52) U.S. Cl. ............... 382/260; 382/303; 358/3.08

(58) Field of Classification Search ........... 358/3.08, 358/3.07; 382/260, 252, 262, 264, 303
See application file for complete search history.

(56) References Cited

U.S. PATENT DOCUMENTS

| | | | | |
|---|---|---|---|---|
| 5,027,078 A | * | 6/1991 | Fan ........................... | 358/3.08 |
| 5,166,810 A | * | 11/1992 | Sorimachi et al. .......... | 358/462 |
| 5,323,247 A | * | 6/1994 | Parker et al. ............... | 358/3.08 |
| 5,333,064 A | * | 7/1994 | Seidner et al. ............. | 358/3.08 |
| 5,343,309 A | * | 8/1994 | Roetling .................... | 358/3.07 |
| 5,506,699 A | * | 4/1996 | Wong ........................ | 358/3.08 |
| 5,798,846 A | * | 8/1998 | Tretter ....................... | 382/262 |
| 5,850,294 A | * | 12/1998 | Apostolopoulos et al. ....................... | 358/426.14 |
| 5,852,475 A | * | 12/1998 | Gupta et al. ................ | 348/606 |
| 6,201,613 B1 | * | 3/2001 | Zhang et al. ............... | 358/1.9 |
| 6,229,578 B1 | * | 5/2001 | Acharya et al. ............ | 348/607 |
| 6,621,595 B1 | * | 9/2003 | Fan et al. ................... | 358/3.26 |
| 6,947,178 B2 | * | 9/2005 | Kuo et al. .................. | 358/3.08 |

FOREIGN PATENT DOCUMENTS

JP         03259193 A   * 11/1991

OTHER PUBLICATIONS

Sato et al., Gary Scale Character Display Device, translation date of JP 03259193 A: Apr. 2004, publication date of JP 03259193 A: Nov. 19, 1991, JPO & Ralph Mcelroy Translation Company, pp. 4 and 6.*
Damera-Venkata et al., Fast Blind Inverse Halftoning, Oct. 4-7, 1998, International Conference Image Processing, 1998, vol. 2, pp. 64-68.*
Ting et al., "Error-Diffused Image Compression using a Binary-to-Gray-Scale Decoder and Predictive Pruned Tree-Structured Vector Quantization" IEEE Transactions on Image Processing, vol. 3, No. 6 (1994).
Hein et al., "Halftone to Continuous-Tone Conversion of Error-Diffusion Coded Images" IEEE Transactions on Image Processing, vol. 4, No. 2 (1995).

(Continued)

*Primary Examiner*—Matthew C. Bella
*Assistant Examiner*—Dennis Rosario
(74) *Attorney, Agent, or Firm*—Joni D. Stutmn-Horn

(57) ABSTRACT

Performing inverse halftoning on a halftoned image includes smoothing the halftoned image using a two-dimensional filter to produce a smoothed image, detecting edge areas in the smoothed image, performing lowpass filtering on non-edge areas of the smoothed image, and generating an enhanced image comprised of the edge areas of the smoothed image and lowpass-filtered non-edge areas of the smoothed image.

19 Claims, 3 Drawing Sheets

OTHER PUBLICATIONS

Kim et al., "Inverse Halftoning Using Binary Permutation Filters" IEEE Transactions on Image Processing, vol. 4, No. 9 (1995).

Wong "Inverse Halftoning and Kernel Estimation for Error Diffusion" IEEE Transactions on Image Processing, vol. 4, No. 4 (1995).

Xiong et al., "Inverse Halftoning Using Wavelets" Dept of Electrical Engineering, University of Hawaii, Honolulu, HI 96822 Dept of Electrical Engineering, Princeton University, 569-572.

Jarvis et al., "A Survey of Techniques for the Display of Continuous Tone Pictures on Bilevel Displays" Computer Graphics Image Processing 5: 13-40 (1976).

Gonzalez "Digital Image Processing" (Index) Addison Wesley, first edition, 1992.

Hamming "Digital Filters" (Index) Englewood Cliffs, NJ: Prentice-Hall, 1976.

Stevenson "Inverse Halftoning via MAP Estimation" IEEE Transactions on Image Processing vol. 6, No. 4 (1997).

Ostromoukhov, et al., "Multi-level Colour Halftoning Algorithms" Ecole Polytechnique Fédérale, Lausanne, Switzerland, SPIE 2949:332-340 (1996).

Floyd et al., "An adaptive algorithm for spatial grey scale", Proc. Soc. Inf. Display, 17, pp. 75-77 (1976).

Eschbach et al., "Error-diffusion algorithm with edge enhancement" JOSA (A) , (12):1844-1850, 1991.

Martins et al., "Halftone coding with JBIG2" Journal of Electronic Imaging 9(1), 52-60 (2000).

* cited by examiner

INVERSE HALFTONING PROCESS

TECHNICAL FIELD

This invention relates to inverse halftoning.

BACKGROUND

Digital halftoning recreates an original shaded image using light and dark pixels. Varying the density and placement of the light and dark pixels in the resulting digitally-halftoned image approximates shading gradations in the original image. Inverse halftoning is a process of enhancing a digitally-halftoned image so that it more closely resembles the original shaded image.

DESCRIPTION

Figure 1:
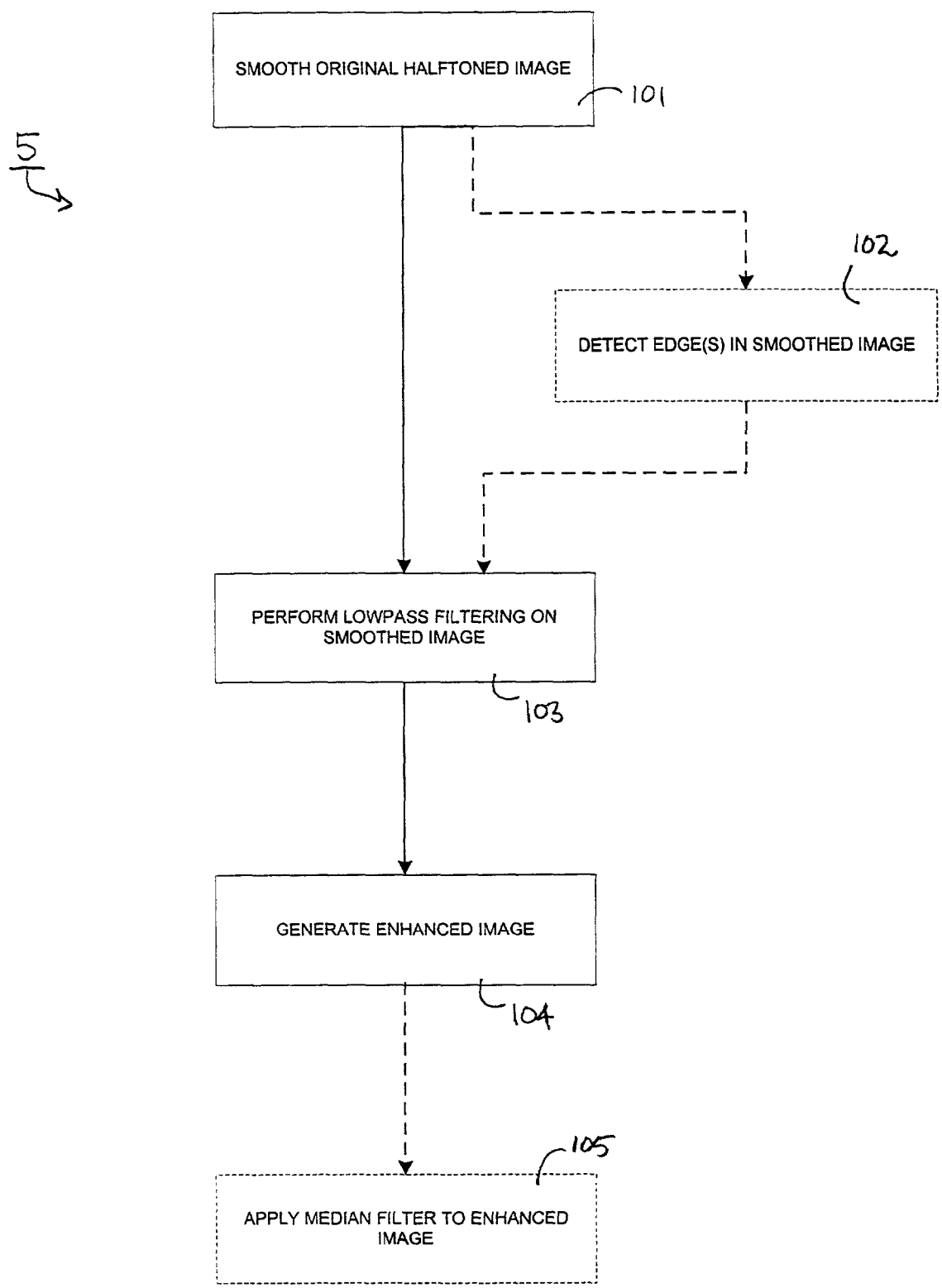
FIG. 1 is a flowchart showing an inverse-halftoning process according to one embodiment of the invention.

Referring to FIG. 1, a process 5 is shown for performing inverse halftoning on a halftoned image. Process 5 is basically a two-part process, with enhancements. In FIG. 1, the enhancements are shown by dotted lines.

In the basic two-part process, process 5 lightly smoothes (101) the halftoned image and then performs (103) lowpass filtering on the halftoned image. To lightly smooth the halftoned image, process 5 applies a two-dimensional (e.g., N×N, where N>1) filter to each pixel in the image.

In one embodiment, a strongly-peaked 3×3 filter is used to perform the light smoothing. Examples of filters to produce different shading effects are (A) and (B) below.

|     |     |     |   |        |     |     |     |   |        |
| --- | --- | --- | - | ------ | --- | --- | --- | - | ------ |
| 1   | 6   | 1   |   |        | 1   | 2   | 1   |   |        |
| 6   | 8   | 6   | * | (1/36) | 2   | 8   | 2   | * | (1/20) |
| 1   | 6   | 1   |   |        | 1   | 2   | 1   |   |        |
|     | (A) |     |   |        |     | (B) |     |   |        |

A filter is applied to an image as follows. The filter matrix is overlaid on a block of N×N (e.g., 3×3) pixels. Each numerical value in the filter matrix is multiplied by a corresponding underlying pixel value. The resulting products are added together and multiplied by the reciprocal of the sum of the filter values (e.g., (1/36) and (1/20) above). The resulting value is stored as a pixel in an intermediary smoothed image. The pixel in the intermediary smoothed image is at the same location in the smoothed image as the center pixel in the block of N×N pixels that were filtered in the original image.

Figure 2:
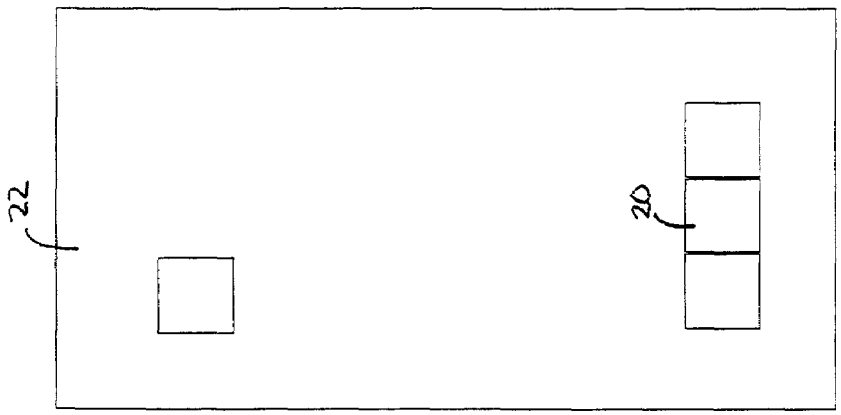
FIG. 2 is a view of pixels in images processed by the inverse halftoning process.
Figure 2:
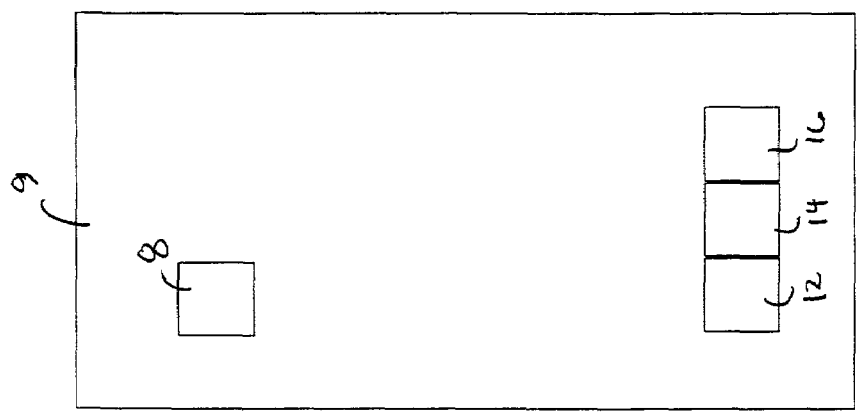
Figure 2:
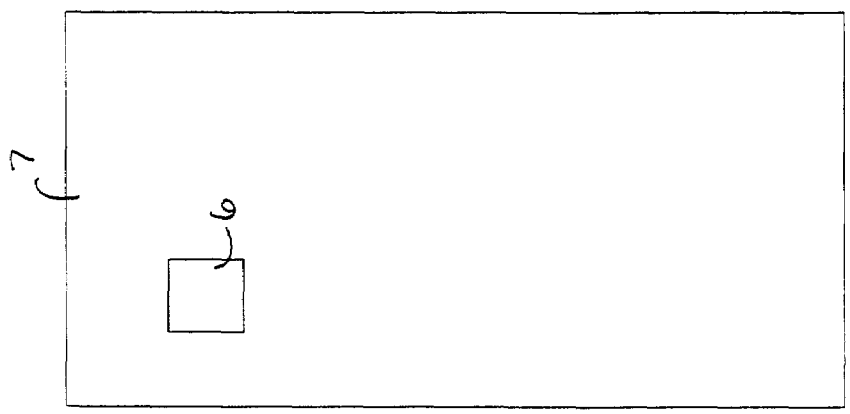

To process other pixels, the filter matrix is moved to an adjacent pixel in the original image. The filter matrix may be moved horizontally or vertically. Referring to FIG. 2, as each pixel 6 in an original image 7 is processed, the resulting filtered pixel is stored at a corresponding location 8 in a smoothed image 9. The resulting smoothed image, or portion thereof, is lowpass filtered to produce an enhanced image. Lowpass filtering is performed in order to reduce artifacts in the image. Examples of artifacts include unwanted spots or image aberrations.

Process 5 performs (103) lowpass filtering using a one-dimensional lowpass filter having a relatively sharp high-frequency cutoff. Examples of well-known lowpass filters that have sharp high-frequency cutoffs, and that may be used, include Hamming and Kaiser filters. In this embodiment, a one-dimensional filter with N (N≧1) taps is used; however, a two-dimensional filter, whose dimensions in some, but not all, instances will be N×N, may be used to perform the lowpass filtering. The lowpass filter may have any number of "Itaps". e.g., 11, 7, 3, etc., and may be weighted by a sinc function to vary filter width. The lowpass filter is moved over the smoothed image, and filters the smoothed image, in much the same way as the 3×3 filter described above.

However, unlike the case of filtering with a 3×3 two-dimensional matrix, filtering with a one-dimensional matrix is done by making two passes, one horizontal and one vertical, over the image. First, the lowpass matrix is overlaid along either a block of row pixels and moved horizontally or a block of column pixels and moved vertically to create an intermediate image. On the second pass, the filter is applied to the intermediate image along the direction not applied in the first pass. For example, a filter having the matrix values 1 6 1 may be used along a row. As above, each numerical value in the filter is multiplied by a corresponding underlying pixel value. The resulting products are added together and multiplied by the reciprocal of the sum of the filter values. The resulting value is assigned to a pixel in an intermediate image. In the second pass, because filtering was done along rows in the first pass, filtering is performed along columns. Thus, the filter is oriented in the vertical direction with the following values 1
6
1 so that the filter values overlay pixels in a column of the intermediate image. As in the first pass, each numerical value in the filter is multiplied by a corresponding underlying pixel value. The resulting products are added together and multiplied by the reciprocal of the sum of the filter values. The resulting value is assigned to a pixel in the final, "enhanced", inverse-halftoned image.

The value is assigned to a pixel in the enhanced image that has the same location in the enhanced image as the pixel below the center pixel of the lowpass filter in the smoothed image. For example, as shown in FIG. 2, N-tap lowpass filter is applied to pixels 12, 14 and 16 of smoothed image 9. The resulting filtered value is assigned to pixel 20 in enhanced image 22. Pixel 20 in enhanced image 22 is at the same location as pixel 14 in smoothed image 9, which is at the center of the lowpass filter.

To process other pixels in the smoothed image, the lowpass filter is moved to an adjacent pixel in the smoothed image. That adjacent pixel is then processed using the two-pass filtering described above. As each pixel in the smoothed image is processed, the resulting filtered pixel value is stored at a corresponding location in the enhanced image. By repeating this process for plural pixels in the smoothed image, process 5 generates (104) an enhanced, inverse-halftoned, version of the smoothed image.

Additional features may be incorporated into process 5. These features are shown in dotted lines on FIG. 1. For example, process 5 may detect (102) edges in the smoothed image and ignore the edges during lowpass filtering (103), i.e., only lowpass-filter the non-edge areas of the smoothed image. Thus, in this case, the enhanced image is comprised of the edge areas of the smoothed image and lowpass-filtered non-edge areas of the smoothed image. One reason for ignoring the edges during lowpass filtering is that lowpass filtering tends to blur the image. To ensure that the edges remain relatively defined, process 5 may detect those edges and perform lowpass filtering selectively, such that the edges are not lowpass filtered.

To detect edges in the smoothed image, process 5 applies an edge filter to the smoothed image. The edge filter may be an N×N filter, which processes pixels in substantially the same manner as the N×N filter described above. That is, the filter matrix is overlaid on a block of N×N (e.g., 3×3) pixels. Each numerical value in the filter is multiplied by a corresponding underlying pixel value. The resulting products are added together to obtain a value. In this case, unlike above, the value is not multiplied by the reciprocal of the sum of the pixel values. If the resulting value has a large magnitude, that is an indication of an edge in the image.

One example of an edge detection filter matrix that may be used in this embodiment is as follows:

| -1 | 0 | 1 |
| -1 | 0 | 1 |
| -1 | 0 | 1 |

Applying this edge detection filter to a flat surface of a pixel would result in a near zero value, since the pixels underneath the first column (−1's) would cancel the pixels underneath the third column (1's). If an edge is present at the center column, the value resulting from applying the filter over the center pixel and its adjacent eight pixels would result in a non-zero magnitude because values along one center are different from other adjacent values. The higher this magnitude, the more pronounced the edge.

Process 5 compares the value that results from applying the edge detection filter to a threshold value. Edges whose values exceed the threshold are ignored during lowpass filtering. This threshold value is set beforehand and is set, as desired, to ignore some edges and account for others. The higher that the threshold value is set, the more edges the process 5 ignores during lowpass filtering (103). That is, if the threshold is set relatively high, only highly-pronounced edges will not be subjected to lowpass filtering, whereas if the threshold is set relatively low, relatively less-pronounced edges will also not be subjected to lowpass filtering.

Process 5 may also apply (105) a median filter to the resulting enhanced image. The median filter is designed to reduce artifacts, such as spots or other aberrations, in the enhanced image. The median filter may also be an N×N filter, which is applied in the manner described above, to further smooth the enhanced image. The median filter may be applied to non-edge portions of the enhanced image only, if desired. In this case, an edge detection filter of the type described above is used to detect edges in the enhanced image prior to applying the median filter to the enhanced image.

Figure 3:
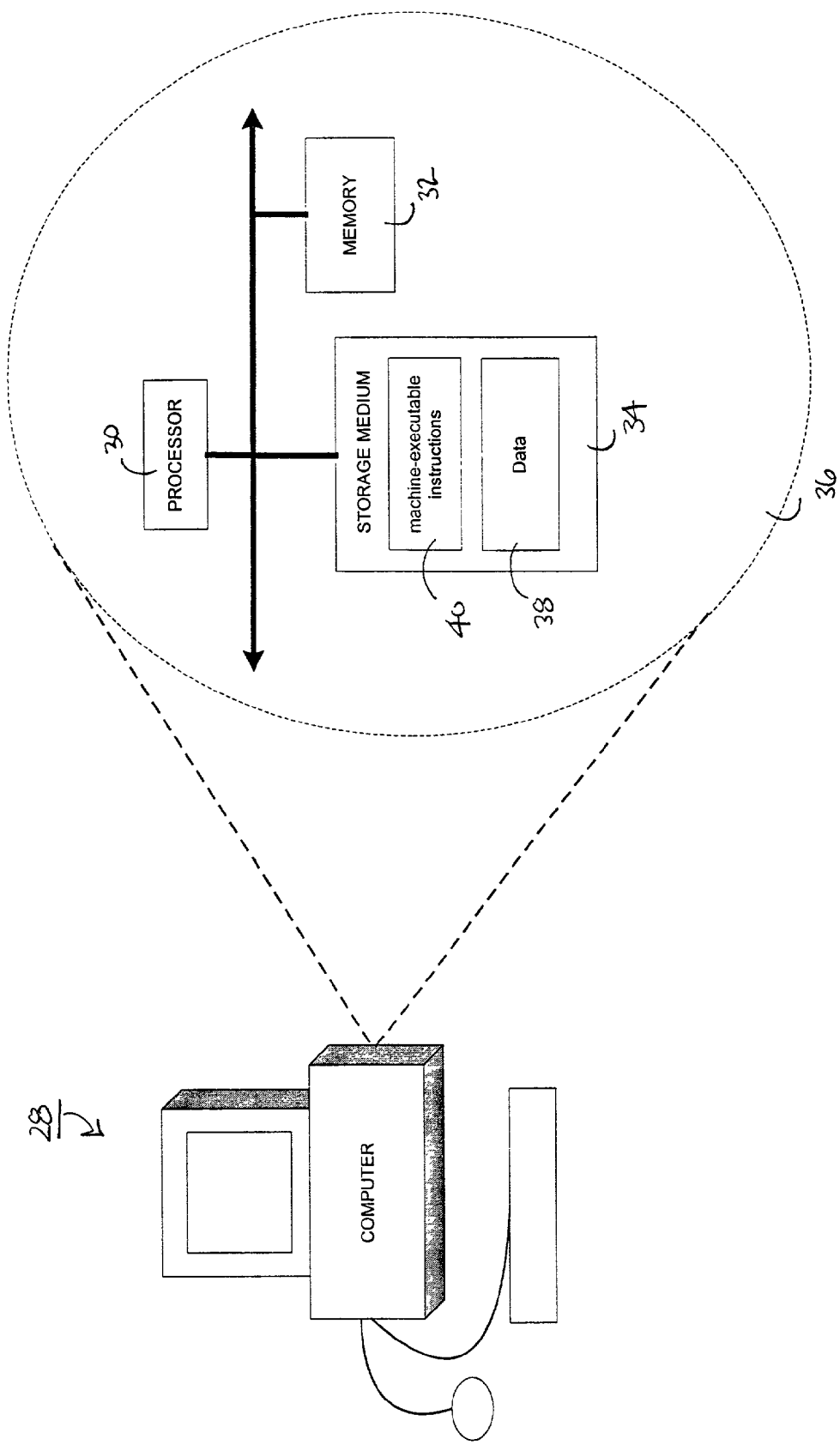
FIG. 3 is a block diagram of computer hardware on which the inverse halftoning process may be implemented.

FIG. 3 shows a computer 28 on which process 5 may be implemented. Computer 28 includes a processor 30, a memory 32, and a storage medium 34 (see view 36). Storage medium 34 stores data 38 for one or more images and machine-executable instructions 40 that are executed by processor 30 out of memory 32 to perform inverse halftoning process 5.

Although a personal computer is shown in FIG. 3, process 5 is not limited to use with the hardware and software of FIG. 3. It may find applicability in any computing or processing environment. Process 5 may be implemented in hardware, software, or a combination of the two. Process 5 may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform process 5 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium/article (e.g., CD-ROM, hard disk, or magnetic diskette) that is readable by a general or special purpose programmable computer for configuring and operating the computer when the storage medium or device is read by the computer to perform process 5. Process 5 may also be implemented as a machine-readable storage medium, configured with a computer program, where, upon execution, instructions in the computer program cause a machine to operate in accordance with process 5.

The invention is not limited to the specific embodiments described above. For example, a Sobel gradient operator may be used for edge detection instead of, or in addition to, the N×N matrix described above. The invention is not limited to the specific filters described herein, to their numerical values, or to their dimensions. The invention can be used to perform inverse halftoning on images received over a network or on any other types of halftoned images.

Other embodiments not described herein are also within the scope of the following claims.

What is claimed is:

1. A method of enhancing an image, comprising:
   first, smoothing the image using a sharply peaked filter to produce a smoothed image;
   detecting an edge in the smoothed image;
   performing lowpass filtering on the smoothed image to produce an enhanced image, wherein lowpass filtering is performed using a high frequency cutoff filter only on non-edge areas of the smoothed image as determined by the edge detection; and
   detecting an edge in the enhanced image; and
   performing median filtering to the enhanced image only on non-edge areas of the enhanced image as determined by the edge detection of the enhanced image.

2. The method of claim 1, wherein smoothing comprises:
   applying a two-dimensional filter to a pixel in the image;
   storing a pixel processed by the two-dimensional filter in the smoothed image; and
   repeating storing and applying for one or more other pixels in the image.

3. The method of claim 1, wherein performing lowpass filtering comprises:
   applying a one-dimensional filter to a pixel in the smoothed image;

storing a pixel processed by the one-dimensional filter in the enhanced image; and repeating storing and applying for one or more other pixels in the smoothed image.

4. The method of claim 1, wherein detecting the edge comprises applying an edge filter to the smoothed image.

5. The method as recited in claim 4, wherein detecting an edge further comprises comparing a predetermined threshold with results of edge filtering, and wherein edge values determined by the edge filtering that exceed the threshold are ignored during lowpass filtering.

6. The method as recited in claim 1, wherein the method of enhancing an image is performed in one pass.

7. A method of enhancing an image, comprising:
   smoothing the image using a sharply peaked filter to produce a smoothed image;
   detecting an edge in the smoothed image;
   performing lowpass filtering using a high frequency cutoff filter on the smoothed image to produce an enhanced image; and
   detecting an edge in the enhanced image; and
   applying a median filter to the enhanced image, wherein the median filter is designed to reduce artifacts on the enhanced image only on non-edge areas of the enhanced image as determined by the edge detection of the enhanced image.

8. The method of claim 7, wherein detecting the edge comprises applying an edge filter to the smoothed image.

9. An article comprising a machine-readable medium that stores machine-executable instructions for enhancing an image, the instructions causing a machine to:
   first, smooth the image using a sharply peaked filter to produce a smoothed image;
   detect edge areas in the smoothed image;
   perform lowpass filtering using a high frequency cutoff filter on the smoothed image to produce an enhanced image, wherein lowpass filtering is performed only on non-edge areas of the smoothed image as determined by the edge detection; and
   detecting an edge in the enhanced image; and
   perform median filtering to the enhanced image only on non-edge areas of the enhanced image as determined by the edge detection of the enhanced image.

10. The article of claim 9, wherein smoothing comprises:
    applying a two-dimensional filter to a pixel in the image;
    storing a pixel processed by the two-dimensional filter in the smoothed image; and
    repeating storing and applying for one or more other pixels in the image.

11. The article of claim 9, wherein performing lowpass filtering comprises:
    applying a one-dimensional filter to a pixel in the smoothed image;
    storing a pixel processed by the one-dimensional filter in the enhanced image; and
    repeating storing and applying for one or more other pixels in the smoothed image.

12. The article of claim 9, wherein detecting the edge comprises applying an edge filter to the smoothed image.

13. An article comprising a machine-readable medium that stores machine-executable, instructions for enhancing an image, the instructions causing a machine to:
    first, smooth the image using a sharply peaked filter to produce a smoothed image;
    detecting an edge in the smoothed image;
    perform lowpass filtering using a high frequency cutoff filter on the smoothed image to produce an enhanced image; and
    detecting an edge in the enhanced image; and
    apply a median filter to the enhanced image, wherein the median filter is designed to reduce artifacts on the enhanced image only on non-edge areas of the enhanced image as determined by the edge detection of the enhanced image.

14. An apparatus for enhancing an image, comprising:
    a memory that stores executable instructions; and
    a processor that executes the instructions to:
      first, smooth the image using a sharply peaked filter to produce a smoothed image;
      detect an edge in the smoothed image;
      perform lowpass filtering using a high frequency cutoff filter on the smoothed image to produce an enhanced image, wherein lowpass filtering is performed only on non-edge areas of the smoothed image as determined by the edge detection; and
      detecting an edge in the enhanced image; and
      perform median filtering to the enhanced image only on non-edge areas of the enhanced image as determined by the edge detection of the enhanced image.

15. The apparatus of claim 14, wherein smoothing comprises:
    applying a two-dimensional filter to a pixel in the image;
    storing a pixel processed by the two-dimensional filter in the smoothed image; and
    repeating storing and applying for one or more other pixels in the image.

16. The apparatus of claim 14, wherein performing lowpass filtering comprises:
    applying a one-dimensional filter to a pixel in the smoothed image;
    storing a pixel processed by the one-dimensional filter in the enhanced image; and
    repeating storing and applying for one or more other pixels in the smoothed image.

17. The apparatus of claim 14, wherein detecting the edge comprises applying an edge filter to the smoothed image.

18. An apparatus for enhancing an image, comprising:
    a memory that stores executable instructions; and
    a processor that executes the instructions to:
      first, smooth the image using a sharply peaked filter to produce a smoothed image;
      detect an edge in the smoothed image; and
      perform lowpass filtering using a high frequency cutoff filter on the smoothed image to produce an enhanced image,
      detecting an edge in the enhanced image; and
      wherein the processor executes instructions to apply a median filter only on non-edge areas of the enhanced image as determined by the edge detection of the enhanced image, and wherein the median filter is designed to reduce artifacts on the enhanced image.

19. The apparatus of claim 18, wherein lowpass filtering is performed only on non-edge areas of the smoothed image, and wherein detecting the edge comprises applying an edge filter to the smoothed image.

* * * * *